US012601213B2

(12) United States Patent
Elsmark et al.

(10) Patent No.: US 12,601,213 B2

(45) Date of Patent: Apr. 14, 2026

(54) ARRANGEMENTS FOR CLOSING ACCESS MEMBER, AND ACCESS MEMBER SYSTEMS

(71) Applicant: ASSA ABLOY AB, Stockholm (SE)

(72) Inventors: Lars Elsmark, Saltsjö-Boo (SE); Kaj Niegmann, Hägersten (SE); Jonas Merkland, Järfälla (SE)

(73) Assignee: ASSA ABLOY AB, Stockholm (SE)

( * ) Notice: Subject to any disclaimer, the term of this patent is extended or adjusted under 35 U.S.C. 154(b) by 233 days.

(21) Appl. No.: 18/576,274

(22) PCT Filed: Jun. 28, 2022

(86) PCT No.: PCT/EP2022/067682
§ 371 (c)(1),
(2) Date: Jan. 3, 2024

(87) PCT Pub. No.: WO2023/280631
PCT Pub. Date: Jan. 12, 2023

(65) Prior Publication Data

US 2024/0376760 A1 Nov. 14, 2024

(30) Foreign Application Priority Data

Jul. 5, 2021 (SE) .................................... 2150875-9

(51) Int. Cl.
*E05F 3/16* (2006.01)
*E05F 1/06* (2006.01)
*E05F 3/20* (2006.01)

(52) U.S. Cl.
CPC .................. *E05F 3/16* (2013.01); *E05F 1/06* (2013.01); *E05F 3/20* (2013.01); *E05Y 2201/21* (2013.01); *E05Y 2201/41* (2013.01)

(58) Field of Classification Search
CPC ....... E05F 3/16; E05F 3/20; E05F 1/06; E05F 5/00; E05Y 2201/21; E05Y 2201/41;
(Continued)

(56) References Cited

U.S. PATENT DOCUMENTS 1,768,161 A 6/1930 Snyder
3,858,274 A * 1/1975 Burton .................... E05F 1/061 16/312

(Continued)

FOREIGN PATENT DOCUMENTS

BE 838415 5/1976
CN 107905659 4/2018

(Continued)

OTHER PUBLICATIONS

"Application No. 2150875 9 1st Office Action incl SE search report mailed Feb. 4, 2022", 11 pages.

(Continued)

*Primary Examiner* — Jason W San
*Assistant Examiner* — Matthew J Sullivan
(74) *Attorney, Agent, or Firm* — Schwegman Lundberg & Woessner, P.A.

(57) ABSTRACT

An arrangement for closing an access member rotatable relative to a frame, the arrangement comprising a frame part for fixation to the frame; an access member part for fixation to the access member, the access member part being rotatable relative to the frame part about a hinge axis between a closed position and an open position; a mechanical force device configured to store mechanical energy from an opening movement of the access member part from the closed position to the open position, and configured to release the stored mechanical energy to a closing movement of the access member part from the open position to the closed position; an electromagnetic generator arranged to be driven (Continued)

by the closing movement to generate electric energy; and a freewheel arranged to disengage during the opening movement and to engage during the closing movement to drive the generator.

18 Claims, 13 Drawing Sheets

(58) Field of Classification Search
CPC ......... E05Y 2201/462; E05Y 2900/132; E05Y 2400/302
See application file for complete search history.

(56) References Cited

U.S. PATENT DOCUMENTS

| | | | | |
|---|---|---|---|---|
| 4,200,957 | A | 5/1980 | Hsu | |
| 4,292,764 | A | 10/1981 | Kochis | |
| 4,506,407 | A * | 3/1985 | Downey | E05C 17/28 16/49 |
| 4,991,259 | A * | 2/1991 | Finkelstein | E05F 1/1223 16/312 |
| 5,018,304 | A * | 5/1991 | Longoria | E05F 15/63 49/340 |
| 5,165,145 | A * | 11/1992 | Sherman | G06F 1/1681 16/303 |
| 5,346,272 | A * | 9/1994 | Priest | E05C 17/20 16/320 |
| 5,551,187 | A * | 9/1996 | Brouwer | E05F 1/006 49/1 |
| 5,651,536 | A | 7/1997 | Daul | |
| 5,913,763 | A * | 6/1999 | Beran | E05F 15/40 74/89.17 |
| 6,698,558 | B1 * | 3/2004 | Caraballo | F16F 9/19 188/266.8 |
| 6,924,730 | B1 * | 8/2005 | Evans | E06B 9/74 340/506 |
| 7,567,159 | B2 * | 7/2009 | Macken | E05C 19/16 16/49 |
| 8,359,790 | B2 * | 1/2013 | Shin | E05F 1/1091 49/31 |
| 8,407,859 | B1 * | 4/2013 | Mitchell | E05D 7/00 16/303 |
| 8,938,852 | B2 * | 1/2015 | Kim | E05F 5/00 16/320 |
| 9,677,310 | B1 * | 6/2017 | Russo | E05D 7/0027 |
| 10,808,445 | B2 * | 10/2020 | Hucker | E05F 5/027 |
| 11,072,964 | B2 * | 7/2021 | Teta | E05F 1/006 |
| 11,434,682 | B2 * | 9/2022 | Sellinger | E05F 15/63 |
| 11,566,459 | B1 * | 1/2023 | Lawrence | E05F 1/14 |
| 11,879,285 | B2 * | 1/2024 | Sorice | E05B 47/00 |
| 11,939,794 | B2 * | 3/2024 | Arbegard | E05B 47/063 |
| 12,116,821 | B2 * | 10/2024 | Yong | E05F 15/619 |
| 12,188,290 | B2 * | 1/2025 | Elsmark | E05F 1/025 |
| 2008/0100035 | A1 | 5/2008 | Schultz et al. | |
| 2011/0099760 | A1 * | 5/2011 | Wun | G06F 1/162 16/337 |
| 2013/0199094 | A1 * | 8/2013 | Lachance | E05B 47/023 49/31 |
| 2014/0068894 | A1 * | 3/2014 | Nagl | E05F 1/1207 16/307 |
| 2019/0242172 | A1 | 8/2019 | Hucker et al. | |
| 2022/0186540 | A1 * | 6/2022 | Cappelli | E05F 5/00 |
| 2024/0084634 | A1 * | 3/2024 | Arbegard | F16D 63/002 |
| 2024/0085090 | A1 * | 3/2024 | Miao | E05F 1/1253 |
| 2024/0376764 | A1 * | 11/2024 | Zhang | F25D 23/028 |
| 2025/0129652 | A1 * | 4/2025 | Von Matern | E05F 3/16 |

FOREIGN PATENT DOCUMENTS

| | | | | |
|---|---|---|---|---|
| DE | 2828827 | | 11/1979 | |
| DE | 102018200946 | | 7/2019 | |
| EP | 0559947 | | 9/1993 | |
| ES | 454574 | A1 * | 4/1978 | E05F 3/14 |
| GB | 473705 | | 10/1937 | |
| GB | 1514632 | | 6/1978 | |
| GB | 2479157 | | 10/2011 | |
| JP | 04118486 | A * | 4/1994 | |
| JP | 2018053634 | | 4/2018 | |
| KR | 102172999 | B1 * | 11/2020 | E05F 5/025 |
| WO | 2008100035 | | 8/2008 | |
| WO | 2023280631 | | 1/2023 | |

OTHER PUBLICATIONS

"PCT EP 2022 067682 International Search Report mailed Oct. 27, 2022", 6 pages.
"PCT EP 2022 067682 Written Opinion mailed Oct. 27, 2022", 9 pages.
"Application No. 2150875 9 2nd Office Action mailed May 29, 2023", 8 pages.

* cited by examiner

ARRANGEMENTS FOR CLOSING ACCESS MEMBER, AND ACCESS MEMBER SYSTEMS

CROSS-REFERENCE TO RELATED APPLICATION(S)

This application is a national stage application under 35 U.S.C. § 371 of PCT Appl. No. PCT/EP2022/067682, titled "Arrangements for Closing Access Member, and Access Member Systems," filed Jun. 28, 2022, which claims priority to Swedish Patent Appl. No. 2150875-9, filed Jul. 5, 2021, each of which is incorporated herein by reference in its entirety.

TECHNICAL FIELD

The present disclosure generally relates to arrangements for closing a door leaf or other access member. In particular, arrangements for closing an access member rotatable relative to a frame, and access member systems comprising such arrangements, are provided.

BACKGROUND

Some conventional door closers comprise a spring and a hydraulic cylinder containing oil. The spring may be increasingly compressed (or otherwise deformed) during opening of the door leaf. The hydraulic cylinder may provide a damping force proportional to the speed of the door leaf. The use of oil may however not be desired, for example due to fire safety, leakage and sustainability. Moreover, such conventional door closers often have unsatisfactory reliability, for example due to temperature changes and wear. Furthermore, such conventional door closers are often bulky.

U.S. Pat. No. 10,487,561 B2 discloses a mechanism for influencing opening and closing movements of a wing of a door, a window, or the like. The mechanism includes a sliding arm disposed between the wing and a fixed frame. The sliding arm is rotatably mounted to the wing or on the frame. A sliding block is disposed in a sliding rail and is coupled to the sliding arm. The sliding rail or the sliding block has means for energy conversion through which mechanical kinetic energy generated by the sliding block is converted into electrical energy to supply at least one electrical component with electric current to at least one of generate a braking torque or drive the sliding block.

SUMMARY

One object of the present disclosure is to provide an arrangement for closing an access member rotatable relative to a frame, which arrangement has a compact design.

A further object of the present disclosure is to provide an arrangement for closing an access member rotatable relative to a frame, which arrangement has relatively few components.

A still further object of the present disclosure is to provide an arrangement for closing an access member rotatable relative to a frame, which arrangement has a cost-efficient design.

A still further object of the present disclosure is to provide an arrangement for closing an access member rotatable relative to a frame, which arrangement enables an improved latching of the access member.

A still further object of the present disclosure is to provide an arrangement for closing an access member rotatable relative to a frame, which arrangement provides a reliable operation.

A still further object of the present disclosure is to provide an arrangement for closing an access member rotatable relative to a frame, which arrangement solves several or all of the foregoing objects in combination.

A still further object of the present disclosure is to provide an access member system comprising a frame, an access member rotatable relative to the frame, and an arrangement for closing the access member, which access member system solves one, several or all of the foregoing objects.

According to a first aspect, there is provided an arrangement for closing an access member rotatable relative to a frame, the arrangement comprising a frame part for fixation to the frame; an access member part for fixation to the access member, the access member part being rotatable relative to the frame part about a hinge axis between a closed position and an open position; a mechanical force device configured to store mechanical energy from an opening movement of the access member part from the closed position to the open position, and configured to release the stored mechanical energy to a closing movement of the access member part from the open position to the closed position; and an electromagnetic generator arranged to be driven by the closing movement to generate electric energy.

The arrangement may replace one or more hinges of an access member system. As a result, fewer components may have to be ordered and installed. The arrangement can thereby provide both access member closing functionality and hinge functionality for the access member with a compact design.

The generator may optionally be concentric with the hinge axis. The positioning of the generator concentric with the hinge axis results in a more compact design of the arrangement. As one alternative, the generator may be offset from the hinge axis.

Throughout the present disclosure, the arrangement may for example be a door closer. In this case, the arrangement can eliminate some or all of the drawbacks associated with prior art door closers containing oil. The arrangement may optionally be a door operator, i.e. for controlling both opening and closing of a door leaf (or other access member).

The force device may be of various types as described herein. The force device may be concentric with the hinge axis. The force device is configured to mechanically force the access member part from the open position to the closed position.

The generator enables various smartness functions to be integrated into the arrangement and eliminates the need for external hardwiring. The generator may comprise a stator and a rotor. The rotor may be driven to rotate about a generator axis relative to the stator by the closing movement to thereby generate electric energy. In this case, the generator axis may be concentric with the hinge axis.

The arrangement may further comprise a generator transmission. The generator transmission may comprise an input member and an output member. Each of the input member and the output member may be concentric with the hinge axis. The input member may be arranged to rotate in common with the access member part about the hinge axis, at least during the closing movement.

The generator transmission may be a speed increasing transmission. That is, the generator transmission may be configured to transmit a first rotational speed of the input member to a second rotational speed of the output member, higher than the first rotational speed. The generator transmission may for example comprise a planetary gearing.

The arrangement may further comprise a freewheel arranged to disengage during the opening movement and to engage during the closing movement to drive the generator. In this case, the opening movement is performed against the force of the force device without electric energy harvesting. The freewheel may be concentric with the hinge axis. The freewheel may be a one-way clutch.

The arrangement may comprise a driven member fixed to the access member part. The freewheel may be arranged between the driven member and the input member of the generator transmission. The driven member may be concentric with the hinge axis. The driven member, the freewheel and the input member may be arranged in a common plane transverse to the hinge axis.

The arrangement may further comprise a control system configured to control an electric load of the generator. In this way, the access member part can be braked as desired and the closing movement of the access member part can accurately controlled.

The control system may comprise various smartness functions. For example, the control system may comprise reading electronics arranged to communicate wirelessly with an external device, such as a mobile phone. The wireless communication may for example be carried out by means of BLE (Bluetooth Low Energy) or RFID (Radio Frequency Identification). In this way, various settings of the arrangement, such as the electric load of the generator to brake the access member part, can be controlled via an application in a mobile phone.

The control system may be configured to control the braking of the closing movement in dependence of the speed of the closing movement. A heavier braking may be applied for higher speeds and less heavy braking, or no braking at all, may be applied for lower speeds. The speed of the closing movement may be determined in various ways, for example based on a rotational speed of the rotor.

The control system may comprise at least one data processing device and at least one memory having at least one computer program stored thereon, the at least one computer program comprising program code which, when executed by the at least one data processing device, causes the at least one data processing device to perform, or command performance of, various steps as described herein.

The control system may be electrically powered by the generator. The arrangement may further comprise an electric energy storage. The energy storage may store electric energy generated by the generator and may electrically power the control system.

The hinge axis may be vertically oriented. In this case, the force device may comprise a lifting transmission arranged to lift the access member part vertically during the opening movement and arranged to lower the access member part vertically by gravity during the closing movement. By means of the lifting transmission, the access member part can be raised relative to the frame part in a direction parallel with the hinge axis during the opening movement, and be lowered by gravity during the closing movement. By utilizing a gravity force acting on the access member part, and on an access member held by the access member part, the force device can be constructed with a less complicated and cheaper design. The lifting transmission may be concentric with the hinge axis.

The lifting transmission may comprise a lifting cam profile and a lifting cam follower arranged to follow the lifting cam profile. The lifting cam follower may comprise a roller. The lifting cam profile may be steeper in a section contacted by the lifting cam follower during a last part of the closing movement than in a remaining section of the lifting cam profile for being contacted by the lifting cam follower. In this way, latching of the access member can be improved. The last part of the closing movement may be within the last ten degrees, such as within the last five degrees, of rotation of the access member part about the hinge axis towards the closed position.

The lifting transmission may further comprise a male spline. The lifting cam follower may be connected to the male spline. The male spline may be rotatable in common with the access member part about the hinge axis, and may be axially movable in common with the access member part along the hinge axis.

The lifting transmission may further comprise a female spline. The female spline may be mate with the male spline. The female spline may rotate in common with the male spline about the hinge axis. The female spline may be arranged to drive the input member of the generator transmission. To this end, the female spline may for example be fixed to the driven member.

The arrangement may further comprise a friction brake arranged to brake the closing movement. When the arrangement comprises both the friction brake and the generator for braking the closing movement, the rating of the generator can be made substantially smaller. Since the friction brake and the generator can be arranged on top of each other along the hinge axis and inside a hollow elongated body, the hollow elongated body can be made more slim, e.g. with a smaller diameter.

The friction brake may comprise a first brake part and a second brake part for frictionally engaging the first brake part. Each of the first brake part and the second brake part may be concentric with the hinge axis. The first brake part may be rotatable about the hinge axis with a rotational speed depending on a speed of the closing movement. The first brake part may be fixed to, or integrally formed with, the output member of the generator transmission. Thus, in case the arrangement comprises a freewheel, the first brake part rotates during the closing movement but not during the opening movement. The second brake part may be rotationally locked about the hinge axis. The second brake part may be arranged to move axially along the hinge axis, towards and away from the first brake part.

The friction brake may be a cone brake having a male part and a female part. In this case, the first brake part and the second brake part may be the male part and the female part, respectively.

The arrangement may further comprise a brake transmission arranged to transmit movements of the access member part between the closed position and the open position to an increase and a decrease of a braking torque of the friction brake. The brake transmission may thus be configured to mechanically vary a contact force between the first brake part and the second brake part in dependence of a rotational position of the access member part about the hinge axis. The contact force may increase during the opening movement, and decrease during the closing movement. However, when the arrangement comprises the freewheel, only the closing movement will be braked by the friction brake.

The brake transmission may be configured to substantially eliminate, or eliminate, the braking torque of the friction brake during a last part of the closing movement. In this way, the braking torque can be cancelled during the last part of the closing movement to thereby improve latching of the access member. The braking torque during the last part of the closing movement may for example be less than 5% of the braking torque when the access member part is rotated 90 degrees about the hinge axis from the closed position. The last part of the closing movement may be within the last ten degrees, such as within the last five degrees, of rotation of the access member part about the hinge axis towards the closed position.

The brake transmission may comprise a brake cam profile and a brake cam follower arranged to follow the brake cam profile. The brake cam profile may be rotationally locked, and axially movable, with respect to the hinge axis. The brake cam follower may be axially locked, and rotationally movable, with respect to the hinge axis. The brake cam follower may be fixed to the access member part. Each of the brake cam profile and the brake cam follower may be concentric with the hinge axis.

The brake transmission may further comprise a brake spring. The brake spring may be arranged to force the second brake part towards the first brake part. The brake spring may for example be arranged between the brake cam profile and the second brake part. The brake spring may be a compression coil spring. The brake spring may concentric with the hinge axis.

The arrangement may further comprise an adjustment mechanism for adjusting a preload of the brake spring. The adjustment mechanism may comprise an adjustment screw. The adjustment mechanism may be configured to adjust a position of the cam follower along the hinge axis. The adjustment mechanism may be accessible from the exterior of the arrangement.

According to a second aspect, there is provided an arrangement for closing an access member rotatable relative to a frame, the arrangement comprising a frame part for fixation to the frame; an access member part for fixation to the access member, the access member part being rotatable relative to the frame part about a vertical hinge axis between a closed position and an open position; a mechanical force device configured to store mechanical energy from an opening movement of the access member part from the closed position to the open position, and configured to release the stored mechanical energy to a closing movement of the access member part from the open position to the closed position; wherein the force device comprises a lifting transmission arranged to lift the access member part vertically during the opening movement and arranged to lower the access member part vertically by gravity during the closing movement.

The arrangement according to the second aspect may or may not comprise the closing spring. Costs can be reduced in case the closing spring is removed. The arrangement according to the second aspect enables the design to be made slim, unobtrusive and less complicated.

The lifting transmission of the second aspect may be of any type according to the present disclosure, in particular according to the first aspect. The arrangement according to the second aspect may or may not comprise the generator. Thus, the arrangement according to the second aspect can be a purely mechanical arrangement. The generator and the control system may be optional add-on features. These features can be added either in production or by retro-fitting to an arrangement already installed in an access member system.

According to a third aspect, there is provided an arrangement for closing an access member rotatable relative to a frame, the arrangement comprising a frame part for fixation to the frame; an access member part for fixation to the access member, the access member part being rotatable relative to the frame part about a hinge axis between a closed position and an open position; a mechanical force device configured to store mechanical energy from an opening movement of the access member part from the closed position to the open position, and configured to release the stored mechanical energy to a closing movement of the access member part from the open position to the closed position; a friction brake arranged to brake the closing movement; and a brake transmission arranged to transmit movements of the access member part between the closed position and the open position to an increase and a decrease of a braking torque of the friction brake.

The arrangement according to the third aspect may or may not comprise the generator. Thus, also the arrangement according to the third aspect can be a purely mechanical arrangement. The generator and the control system may be optional add-on features. These features can be added either in production or by retro-fitting to an arrangement already installed in an access member system. The force device, the friction brake and the brake transmission according to the third aspect may be of any type according to the present disclosure.

The following features apply for each of the first, second and third aspects. The arrangement may comprise a hollow elongated body. The force device may be arranged inside the hollow elongated body. The hollow elongated body may be tubular. The hollow elongated body may have a constant exterior profile along the hinge axis. The exterior profile may be round, square or of other polygonal shapes. The generator may be arranged inside the hollow elongated body if a generator is used. Furthermore, any of the following parts (if used) may be arranged inside the hollow elongated body: the freewheel, the driven member, the control system, the generator transmission, the lifting transmission, the friction brake and the brake transmission.

The frame part may comprise a frame part attachment structure. The frame part may be attached to the frame by means of the frame part attachment structure, for example with fasteners therethrough. The access member part may comprise an access member attachment structure. The access member part may be attached to the access member by means of the access member attachment structure, for example with fasteners therethrough. Except for the frame part attachment structure and the access member attachment structure, all components of the arrangement may be provided inside the hollow elongated body. The hollow elongated body may be concentric with the hinge axis.

The arrangement may have a modular design. That is, some components of the arrangement described herein can be selectively added to, or removed from, the arrangement.

The force device may comprise a closing spring arranged to force the access member part towards the closed position. The closing spring may be a torsion spring concentric with the hinge axis. A first end of the closing spring may be fixed, directly or indirectly, to the frame part, and a second end of the closing spring may be fixed, directly or indirectly, to the access member part. The second end of the closing spring may for example be fixed to the driven member, which in turn is fixed to the access member part. The closing spring may be preloaded in the closed position.

According to a fourth aspect, there is provided an access member system comprising the frame, the access member and an arrangement according to the present disclosure, wherein the frame part is fixed to the frame and the access member part is fixed to the access member. The access member may be rotatable relative to the frame about the hinge axis. The access member may be a door leaf. Further examples of access members comprise windows and hatches.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
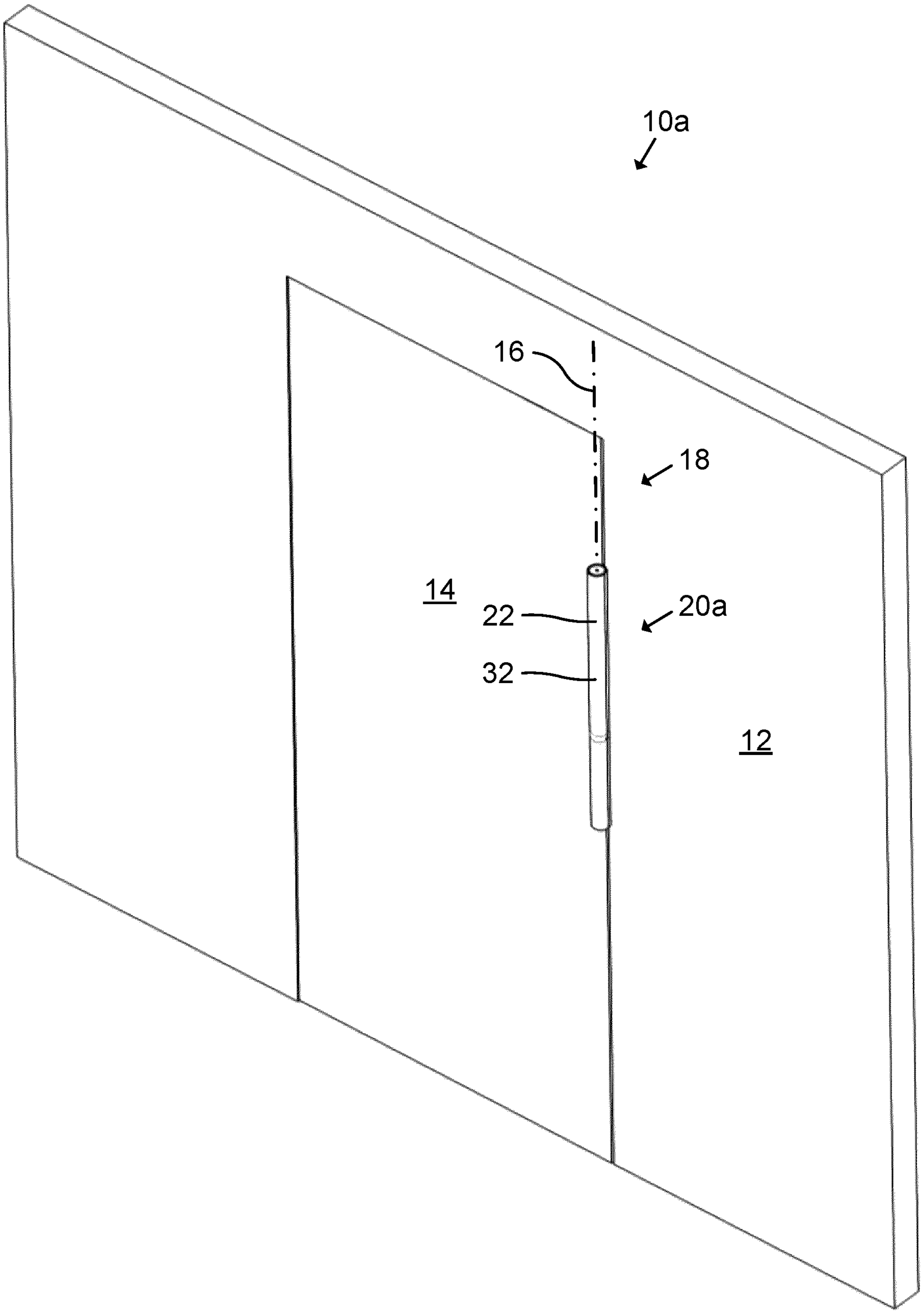
FIG. 1: schematically represents a perspective view of an access member system comprising an access member in a closed position and an arrangement.

In the following, arrangements for closing an access member rotatable relative to a frame, and access member systems comprising such arrangements, will be described. The same or similar reference numerals will be used to denote the same or similar structural features.

FIG. 1 schematically represents a perspective view of an access member system 10*a*. The access member system 10*a* comprises a frame 12 and an access member 14, here exemplified as a door leaf. The access member 14 is rotatable relative to the frame 12 about a hinge axis 16. The hinge axis 16 is vertical in this example. In FIG. 1, the access member 14 is in a closed position 18.

The access member system 10*a* further comprises an arrangement 20*a* for closing the access member 14. The arrangement 20*a* of this example is a door closer. The arrangement 20*a* serves both as a hinge and as a door closer for the access member 14. The arrangement 20*a* may optionally be upgraded to a door operator.

The arrangement 20*a* comprises a hollow elongated body, here exemplified as a tubular body 22. In this example, the tubular body 22 is arranged concentric with the hinge axis 16. As shown in FIG. 1, the arrangement 20*a* has a very slim and unobtrusive design. The tubular body 22 of this section has a circular exterior profile with a constant exterior diameter along the hinge axis 16.

Figure 2:
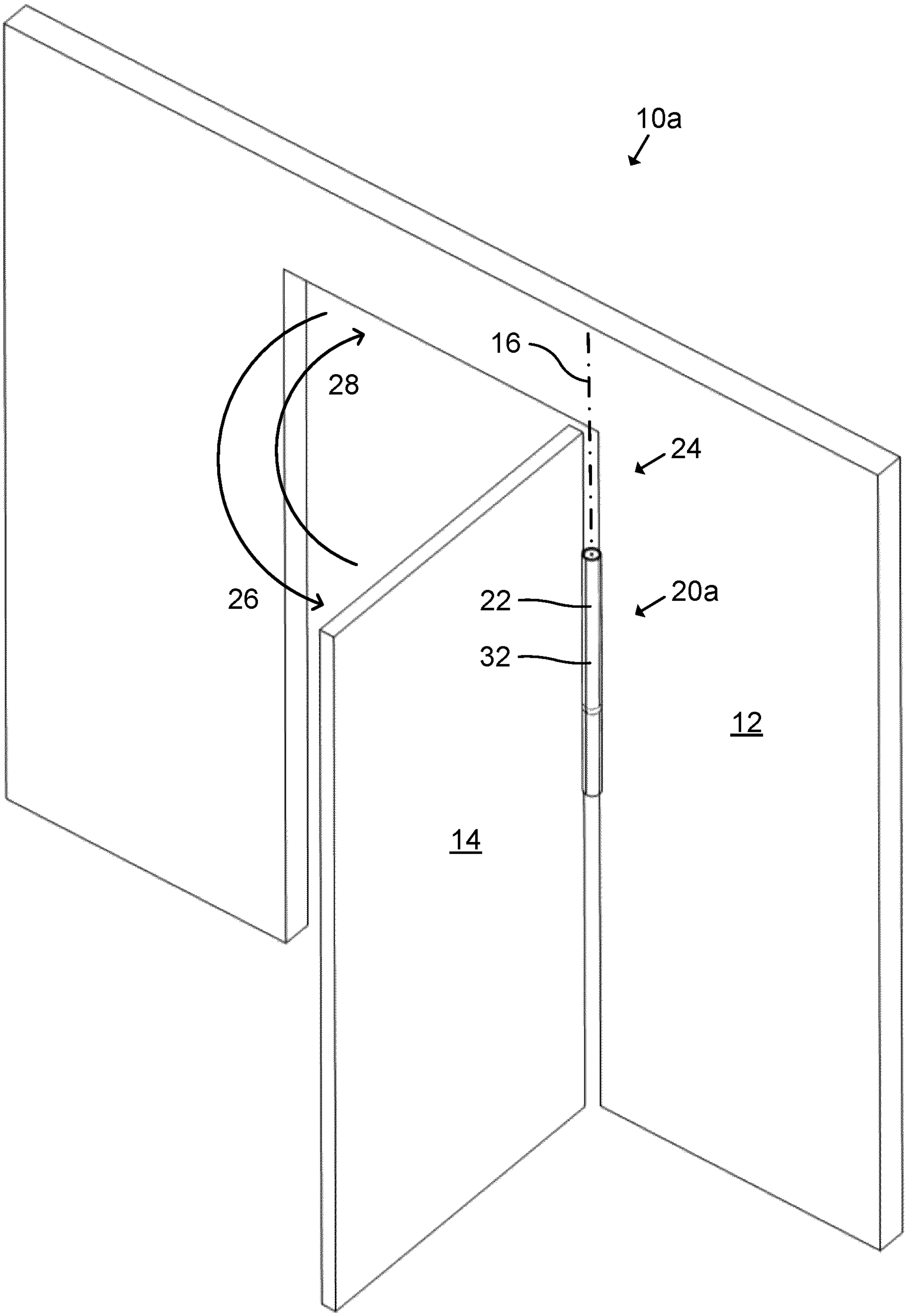
FIG. 2: schematically represents a perspective view of the access member system when the access member is in an open position.

FIG. 2 schematically represents a perspective view of the access member system 10*a* when the access member 14 is in an open position 24. The access member 14 is rotatable about the hinge axis 16 from the closed position 18 to the open position 24 with an opening movement 26, and from the open position 24 to the closed position 18 with a closing movement 28.

Figure 3:
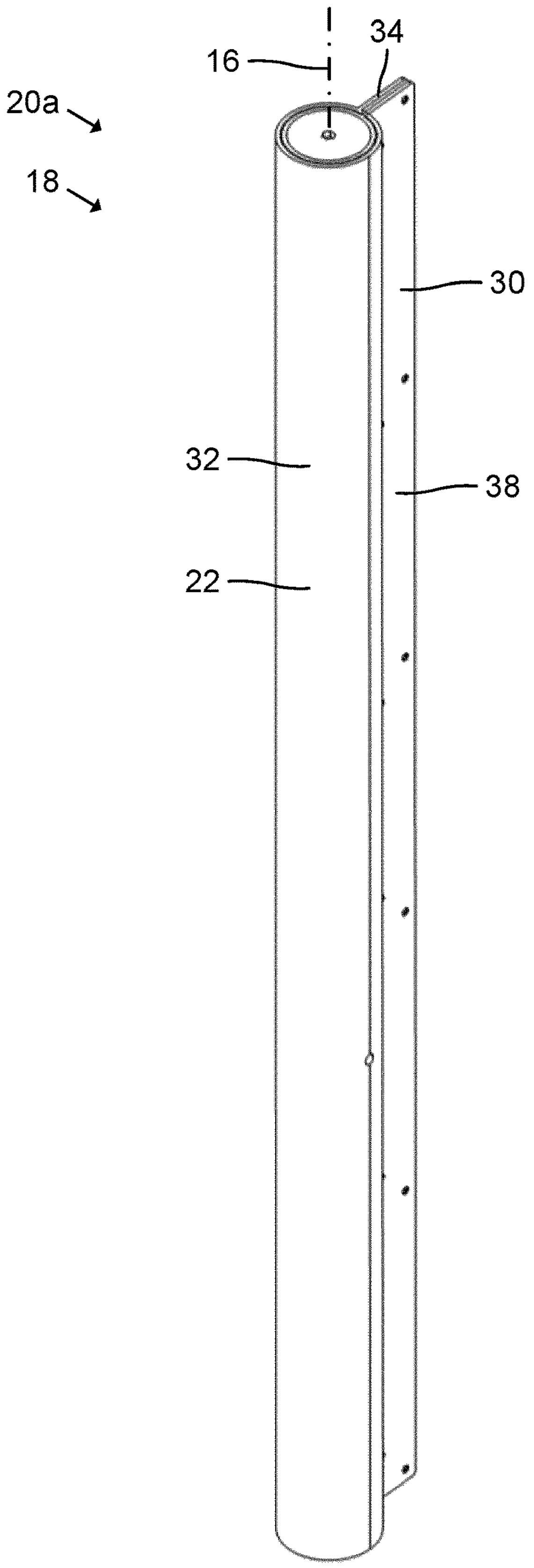
FIG. 3: schematically represents a perspective side view of the arrangement.

FIG. 3 schematically represents a perspective side view of the arrangement 20*a*. The arrangement 20*a* comprises a frame part 30 and an access member part 32. The frame part 30 is fixed to the frame 12 and the access member part 32 is fixed to the access member 14.

Figure 4A:
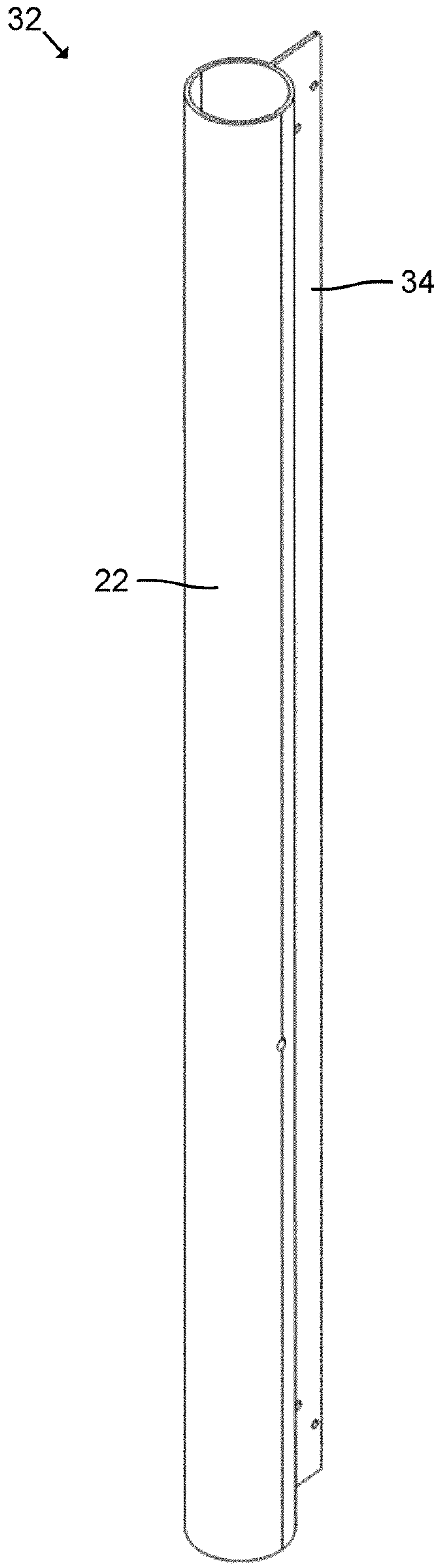
FIG. 4*a*: schematically represents a perspective side view of an access member part of the arrangement.

FIG. 4*a* schematically represents a perspective side view of the access member part 32. The access member part 32 comprises a tube and an access member attachment structure 34 extending radially out from the tube (with respect to the hinge axis 16). The access member attachment structure 34 is here exemplified as a plate having through holes for receiving fasteners to fix the access member part 32 to the access member 14. The tube of the access member part 32 here forms the tubular body 22.

Figure 4B:
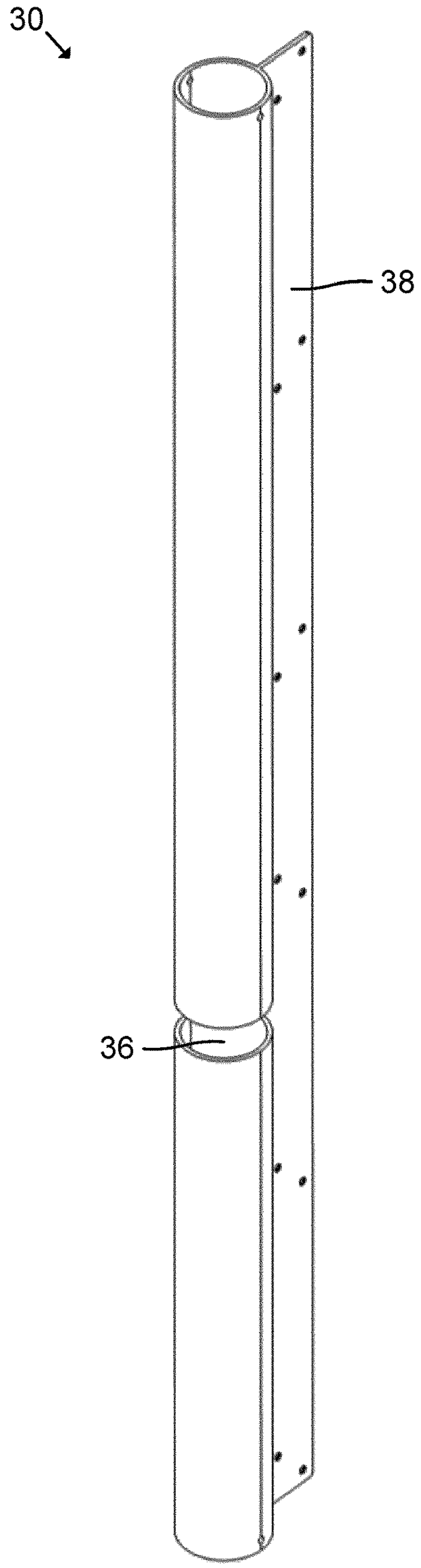
FIG. 4*b*:schematically represents a perspective side view of a frame part of the arrangement.

FIG. 4*b* schematically represents a perspective side view of the frame part 30. The frame part 30 comprises two tube sections separated by a gap 36, and a frame attachment structure 38 extending radially out from the tube sections (with respect to the hinge axis 16). The frame attachment structure 38 is here exemplified as a plate having through holes for receiving fasteners to fix the frame part 30 to the frame 12.

Figure 5A:
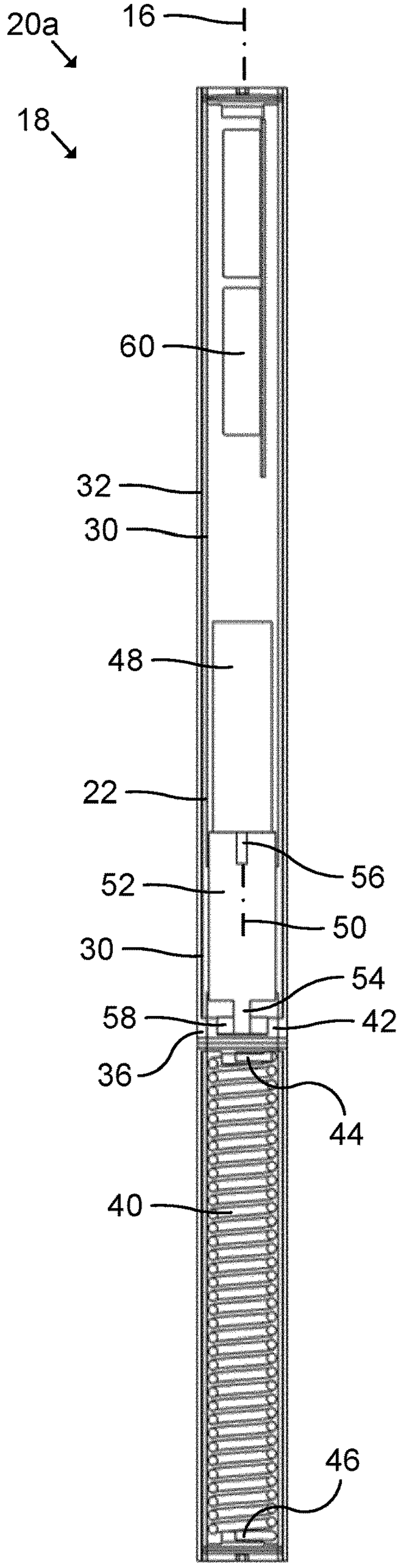
FIG. 5*a*: schematically represents a cross-sectional side view of the arrangement.
Figure 5B:
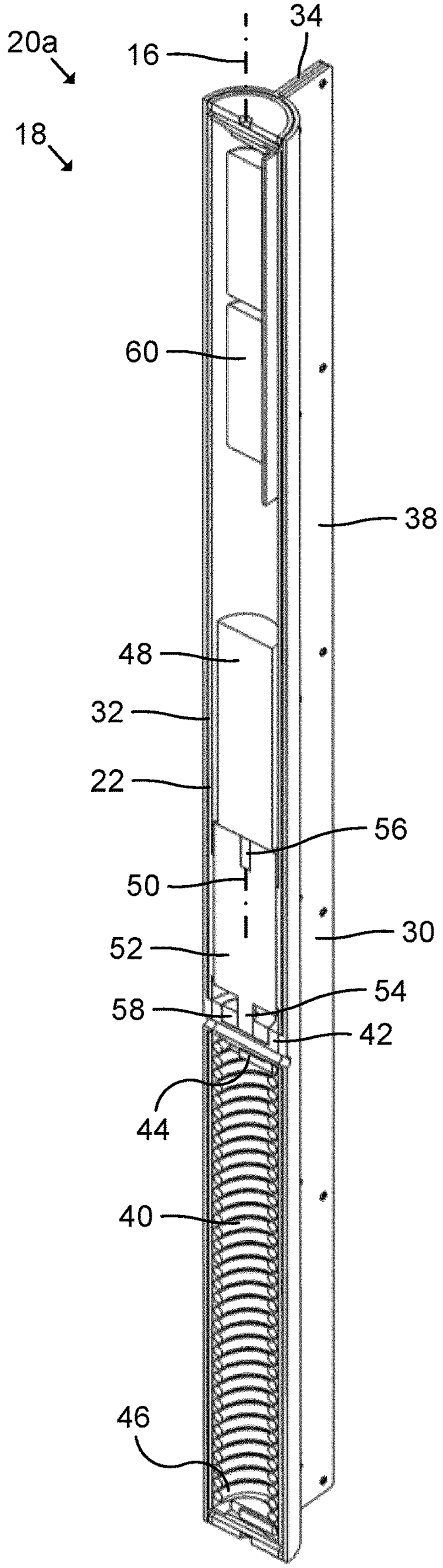
FIG. 5*b*: schematically represents a cross-sectional perspective side view of the arrangement.

FIG. 5*a* schematically represents a cross-sectional side view of the arrangement 20*a*, and FIG. 5*b* schematically represents a cross-sectional perspective side view of the arrangement 20*a*. With collective reference to FIGS. 5*a* and 5*b*, the arrangement 20*a* further comprises a closing spring 40. The closing spring 40 is one example of a mechanical force device according to the present disclosure. The closing spring 40 of this example is a torsion coil spring concentric with the hinge axis 16. The closing spring 40 is arranged inside the tubular body 22. In the closed position 18, the closing spring 40 is pretensioned and exerts a closing torque on the access member part 32 that holds the access member part 32 and the access member 14 in the closed position 18.

The arrangement 20*a* further comprises an optional driven member 42. The driven member 42 is fixed to the access member part 32, here through the gap 36. A first end 44 (here the upper end) of the closing spring 40 is fixed to the driven member 42. The first end 44 may alternatively be fixed directly to the access member part 32. A second end 46 (here the lower end) of the closing spring 40 is fixed to the frame part 30.

The first end 44 rotates together with the access member part 32 and the access member 14 about the hinge axis 16. The second end 46 remains stationary when the access member part 32 and the access member 14 rotate about the hinge axis 16. The closing spring 40 thereby becomes more deformed during the opening movement 26 and less deformed during the closing movement 28.

The arrangement 20*a* of this example further comprises an electromagnetic generator 48. The generator 48 is arranged to harvest electric energy by movements of the access member part 32 and the access member 14 about the hinge axis 16. The generator 48 comprises a stator and a rotor rotatable relative to the stator about a generator axis 50. As shown in FIGS. 5*a* and 5*b*, the generator axis 50 of this example is concentric with the hinge axis 16. Moreover, the generator 48 is arranged inside the tubular body 22.

The arrangement 20*a* of this example further comprises a generator transmission 52. The generator transmission 52 is here positioned between the generator 48 and the closing spring 40 along the hinge axis 16. The generator transmission 52 is arranged inside the tubular body 22 and is here concentric with the hinge axis 16.

The generator transmission 52 comprises an input member 54 and an output member 56. Each of the input member 54 and the output member 56 is concentric with the hinge axis 16 in this example. The generator transmission 52 is here a speed increasing transmission such that the output member 56 rotates faster than the input member 54. To this end, the generator transmission 52 may for example comprise a planetary gearing. The rotor is here fixed to the output member 56.

The arrangement 20*a* of this example further comprises a freewheel 58. The freewheel 58 is arranged to disengage during the opening movement 26 and to engage during the closing movement 28. The freewheel 58 is arranged inside the tubular body 22 and is in this example concentric with the hinge axis 16. As shown in FIGS. 5*a* and 5*b*, the driven member 42, the freewheel 58 and the input member 54 are positioned in a common plane transverse to the hinge axis 16.

In case the arrangement 20*a* is upgraded to a door operator, the freewheel 58 may be omitted. The first end 44 may then be fixed to the input member 54.

One part of the freewheel 58 is fixed with respect to the access member part 32, here fixed to the driven member 42. Another part of the freewheel 58 is fixed to the input member 54. When the driven member 42 is rotated in a first direction during the opening movement 26, the freewheel 58 is disengaged such that the driven member 42 rotates relative to the input member 54, which remains stationary. When the driven member 42 is rotated in a second direction, opposite to the first direction, during the closing movement 28, the freewheel 58 is engaged such that the driven member 42 and the input member 54 rotate in common about the hinge axis 16.

The arrangement 20*a* of this example further comprises a control system 60. The generator 48 is here arranged between the control system 60 and the generator transmission 52. The control system 60 is arranged inside the tubular body 22, here in an uppermost region of the tubular body 22.

The control system 60 is in signal communication with the generator 48. The control system 60 comprises an electrical energy storage, such as a capacitor or a battery, and is electrically powered by the generator 48. The control system 60 is configured to control an electric load of the generator 48. In this way, movements of the access member part 32 and the access member 14 can be accurately braked.

The tubular body 22 provides lots of space vertically to house various components. Except for the access member attachment structure 34 and the frame attachment structure 38 that protrude outside the tubular body 22, all mechanical and electrical components of the arrangement 20*a* are packaged inside the slim tubular body 22. The arrangement 20*a* therefore has a very compact and unobtrusive design. As can be gathered from FIG. 1, the tubular body 22 can be extended further along the hinge axis 16 to provide additional space inside the tubular body 22.

Figure 6:
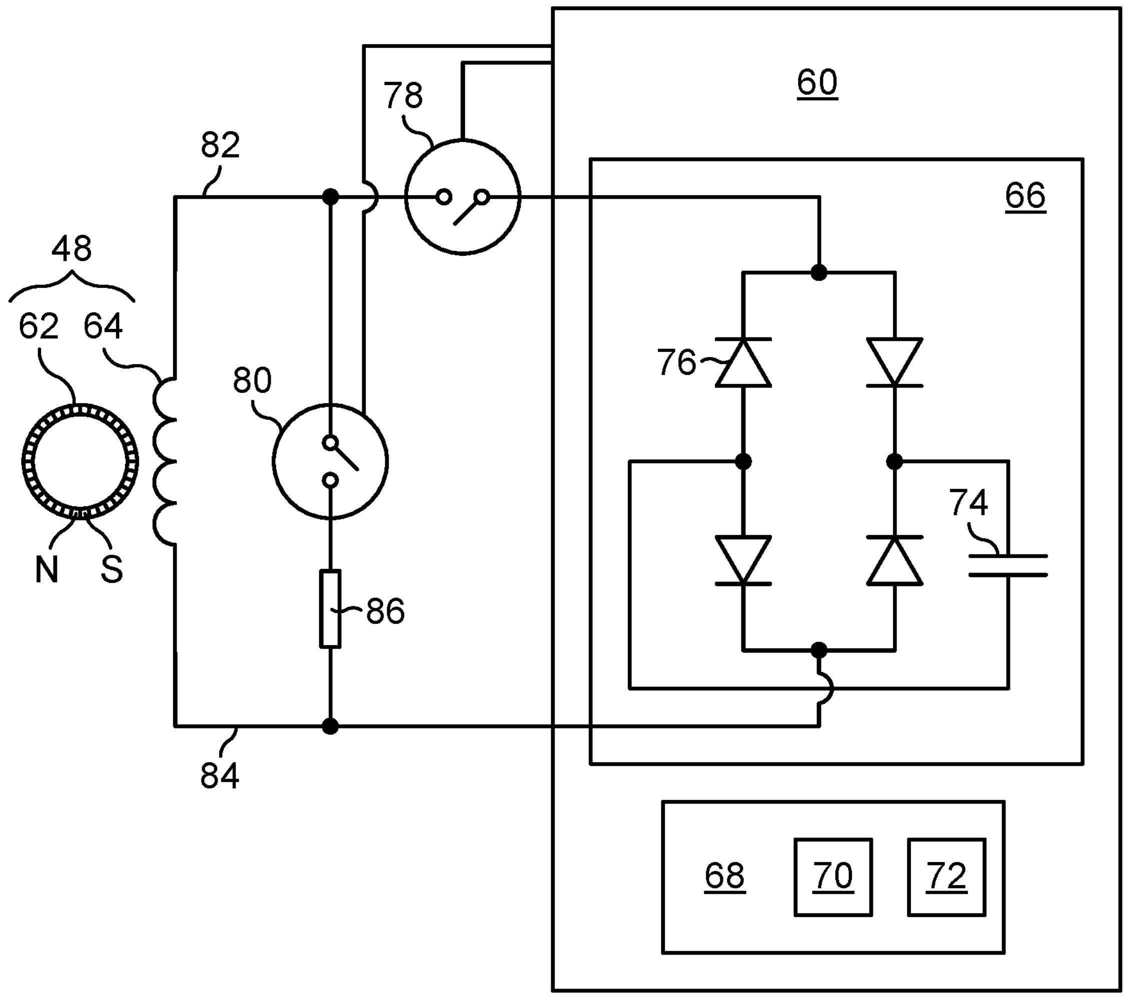
FIG. 6: schematically represents a generator and a control system.

FIG. 6 schematically represents the generator 48 and the control system 60. In FIG. 6, the rotor 62 and the stator 64 of the generator 48 can be seen. The control system 60 of the specific example in FIG. 6 comprises power management electronics 66 and a microcontroller 68. The microcontroller 68 comprises a data processing device 70 and a memory 72. A computer program is stored in the memory 72. The computer program comprises program code which, when executed by the data processing device 70 causes the data processing device 70 to perform, or command performance of, various steps as described herein.

The power management electronics 66 in FIG. 6 comprises energy harvesting electronics including an electric energy storage, here exemplified as a capacitor 74, and four diodes 76 arranged in a diode bridge. The diodes 76 are arranged to rectify the voltage from the generator 48.

The arrangement 20*a* further comprises a disconnection switch 78 and a shorting switch 80. The disconnection switch 78 and the shorting switch 80 are examples of control elements. The disconnection switch 78 and the shorting switch 80 are electrically powered by the generator 48.

Each of the disconnection switch 78 and the shorting switch 80 is controlled by the control system 60, more specifically by the microcontroller 68. FIG. 6 further shows a positive line 82 and a ground line 84. The positive line 82 and the ground line 84 are connected to respective terminals of the generator 48. In this example, the disconnection switch 78 is provided on the positive line 82. Each of the disconnection switch 78 and the shorting switch 80 may be implemented using a transistor, such as a MOSFET (Metal Oxide Semiconductor Field Effect Transistor).

The disconnection switch 78 is arranged to selectively disconnect the generator 48. When the disconnection switch 78 is open, the electric resistance becomes high, and the rotor 62 rotates lightly, in comparison with when the rotor 62 is rotated to harvest electric energy.

The shorting switch 80 is arranged to selectively short-circuiting the terminals of the generator 48 over an electric resistor 86. When the shorting switch 80 is closed, the harvested electric energy is converted to heat in the resistor 86. The rotor 62 thereby rotates heavily in comparison with when the rotor 62 is rotated to harvest electric energy. Thus, when the shorting switch 80 is closed, a high counter torque is provided in the generator 48, making the rotor 62 heavy to rotate.

By selectively controlling the disconnection switch 78 and the shorting switch 80, the control system 60 can selectively change an electric load of the generator 48 in order to brake movements of the access member 14.

When the access member 14 is in the closed position 18, a user may push or pull the access member 14 to perform the opening movement 26. During the opening movement 26, the closing spring 40 is increasingly deformed and the freewheel 58 is disengaged. When the user releases the access member 14 in the open position 24, the access member 14 is forced by the closing spring 40 to perform the closing movement 28. During the closing movement 28, the freewheel 58 is engaged such that the input member 54 of the generator transmission 52 rotates in common with the access member 14. The generator transmission 52 thereby drives the generator 48 to harvest electric energy. The control system 60 controls the electric load of the generator 48 to selectively brake or stop the closing movement 28 of the access member 14, for example based on a rotational speed of the access member 14. The braking may be released at the end of the closing movement 28, such as at the last five degrees of the closing movement 28. In this way, latching of the access member 14 to the frame 12 can be made stronger.

Figure 7:
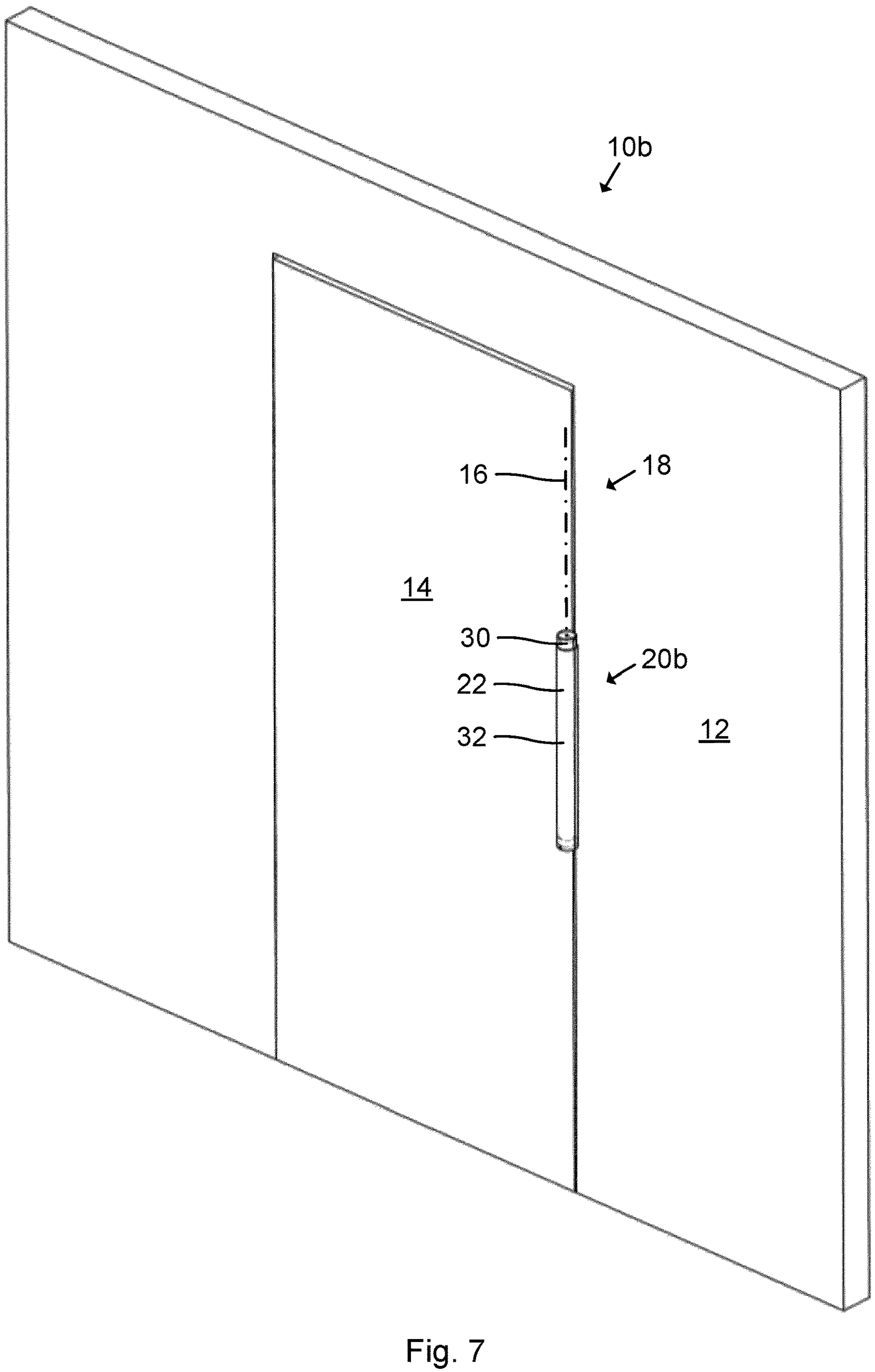
FIG. 7: schematically represents a perspective view of a further access member system comprising an access member in a closed position and a further example of an arrangement.

FIG. 7 schematically represents a perspective view of a further access member system 10*b*. The access member system 10*b* comprises a further example of an arrangement 20*b* for closing the access member 14. Mainly differences with respect to arrangement 20*a* and the access member system 10*a* will be described. In FIG. 7, the access member 14 is in the closed position 18. As shown in FIG. 7, a vertical gap between the access member 14 and the frame 12 is slightly larger than in FIG. 1. Moreover, a top of the frame part 30 of the arrangement 20*b* is visible in the closed position 18.

Figure 8:
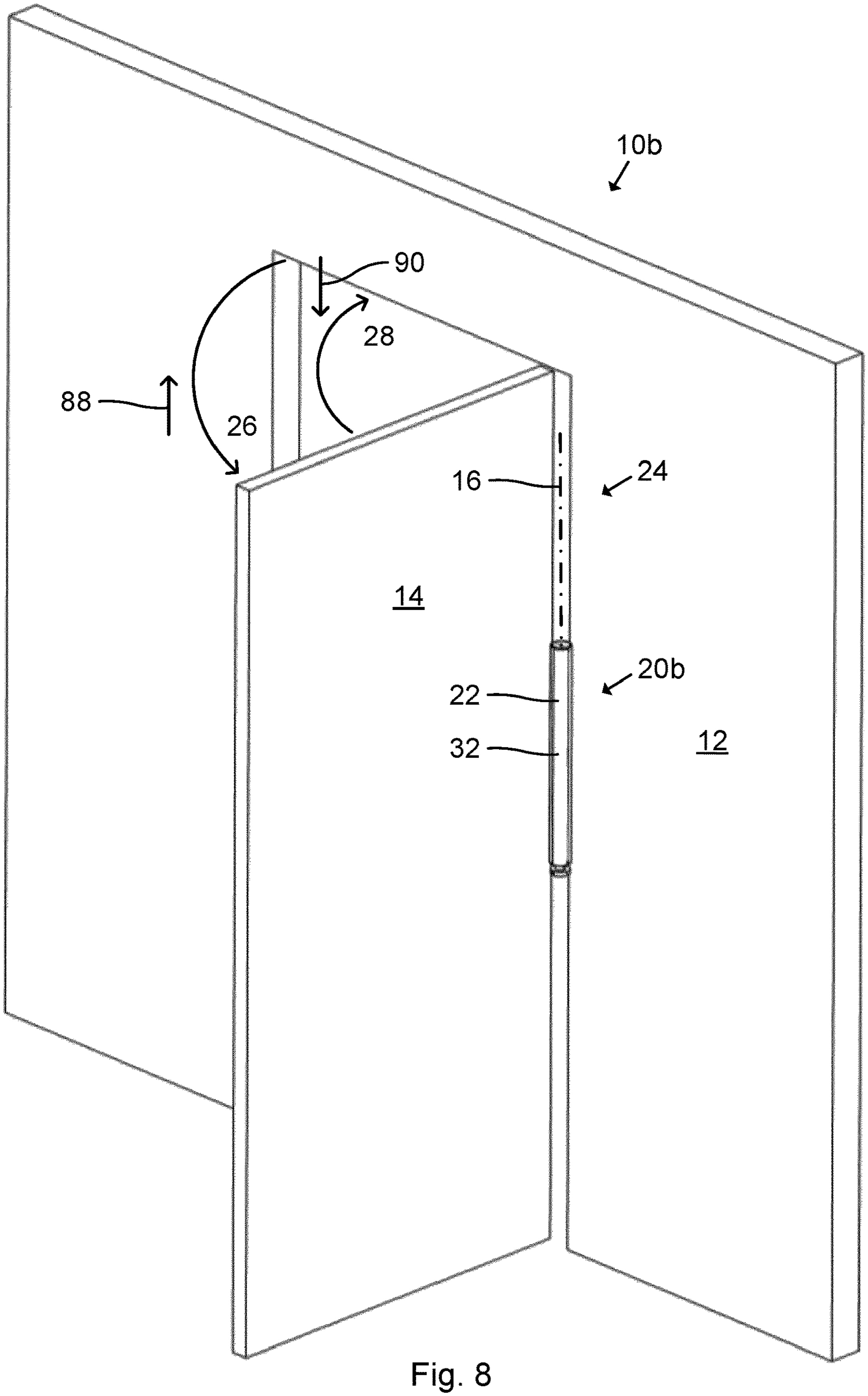
FIG. 8: schematically represents a perspective view of the access member system in FIG. 7 when the access member is in an open position.

FIG. 8 schematically represents a perspective view of the access member system 10*b* when the access member 14 is in the open position 24. As illustrated in FIG. 8, the arrangement 20*b* causes the access member 14 to be lifted vertically during the opening movement 26, as shown by arrow 88. Conversely, the arrangement 20*b* causes the access member 14 to be lowered vertically during the closing movement 28, as shown by arrow 90.

Figure 9A:
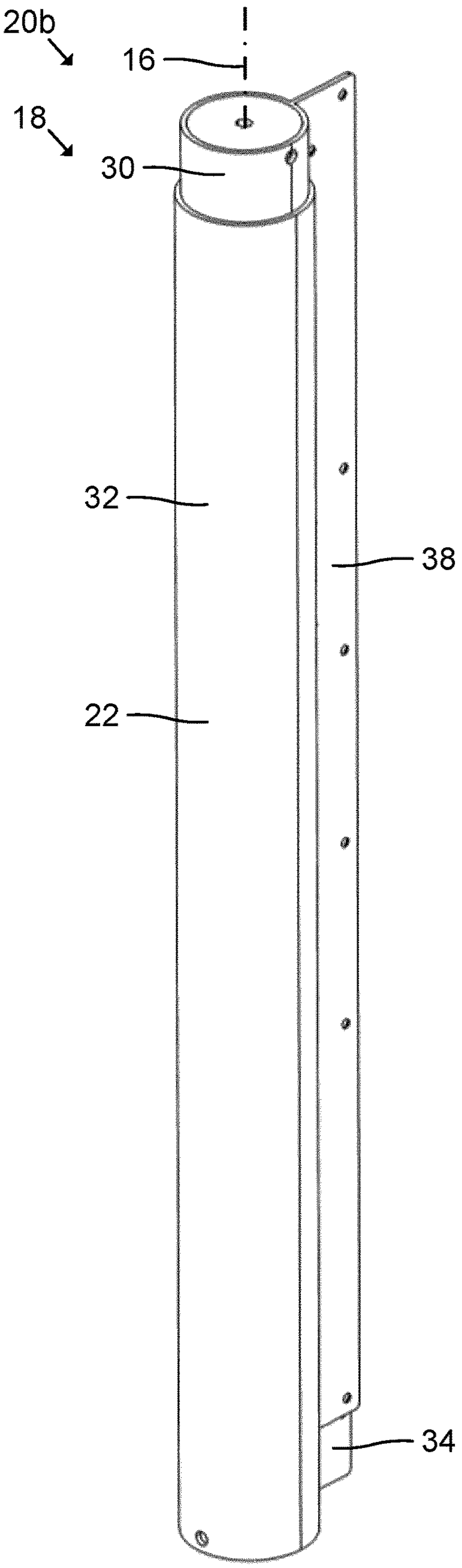
FIG. 9*a*: schematically represents a perspective side view of the arrangement in FIGS. 7 and 8.
Figure 9B:
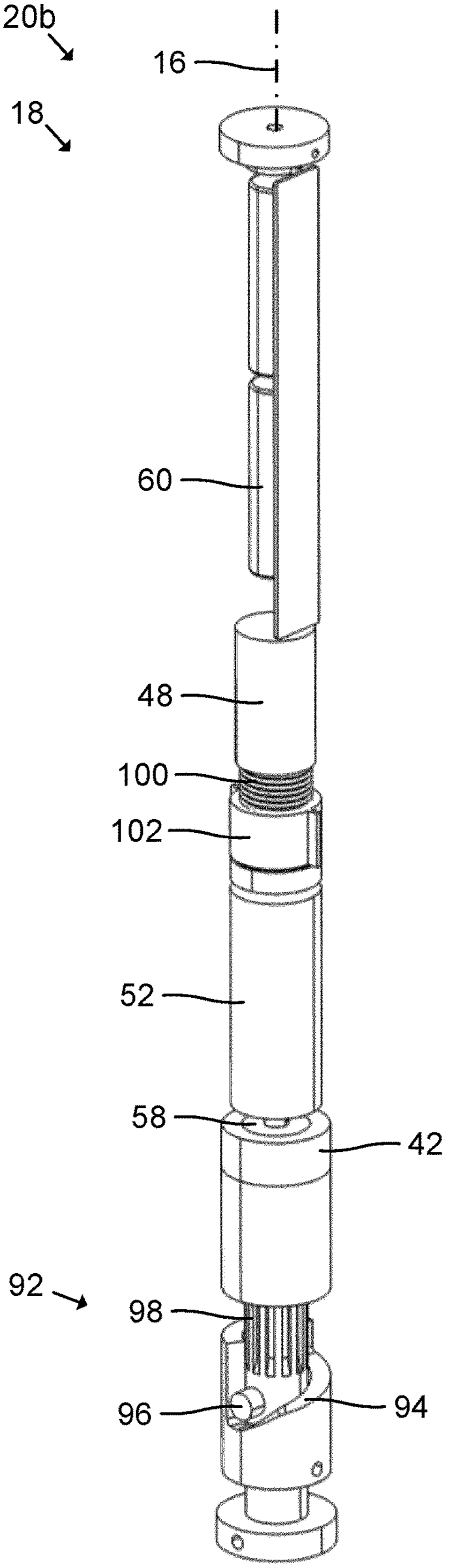
FIG. 9*b*: schematically represents a partial perspective side view of the arrangement in FIGS. 7 and 8.

FIG. 9*a* schematically represents a perspective side view of the arrangement 20*b*. As shown in FIG. 9*b*, the access member attachment structure 34 is positioned slightly lower than the frame attachment structure 38 in the closed position 18. As a consequence, a part of a tube section of the frame part 30 extends upwardly from the tube of the access member part 32. Both the tube of the access member part 32 and the protruding tube section of the frame part 30 here form the tubular body 22.

FIG. 9*b* schematically represents a partial perspective side view of the arrangement 20*b*. In FIG. 9*b*, the frame part 30 and the access member part 32 are removed. The arrangement 20*b* does not comprise a closing spring. Instead, the arrangement 20*b* comprises a lifting transmission 92. The lifting transmission 92 is a further example of a mechanical force device configured to store mechanical energy from the opening movement 26 of the access member 14, and configured to release mechanical energy to the closing movement 28 of the access member 14. The lifting transmission 92 is arranged inside the tubular body 22. Moreover, the lifting transmission 92 is concentric with the hinge axis 16 in this example.

The lifting transmission 92 of this example comprises a lifting cam profile 94 and a lifting cam follower 96 arranged to follow the lifting cam profile 94. The lifting cam profile 94 is fixed to the frame part 30, here in a lower end thereof. The lifting cam profile 94 comprises a helical track, here concentric with the hinge axis 16. As shown in FIG. 9*b*, an inclination of the lifting cam profile 94 with respect to horizontal is steeper in a last section, e.g. the section of the lifting cam profile 94 contacted by the lifting cam follower 96 during the last ten degrees of the closing movement 28.

The lifting transmission 92 further comprises a male spline 98. The lifting cam follower 96 is here a roller connected to the male spline 98 and protruding radially outwards therefrom. The lifting cam follower 96 is only movable relative to the male spline 98 about a roller axis perpendicular to the hinge axis 16. Alternatively, the lifting cam follower 96 may be fixed to the male spline 98.

The male spline 98 is fixed to the access member part 32 and is thus rotatable in common with the access member part 32 about the hinge axis 16. Moreover, the male spline 98 is vertically lifted and lowered in common with the access member part 32.

FIG. 9*b* further shows a brake spring 100 and a female part 102 of a friction brake of the arrangement 20*b*.

Figure 10A:
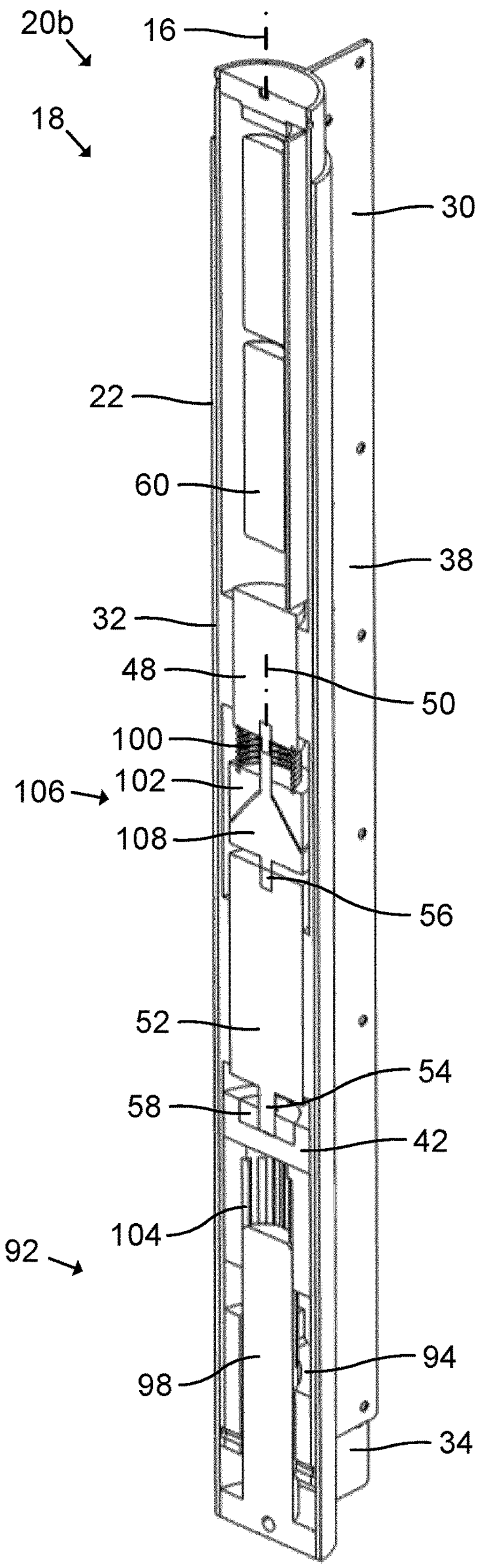
FIG. 10*a*: schematically represents a cross-sectional perspective side view of the arrangement in FIGS. 7 to 9.
Figure 10B:
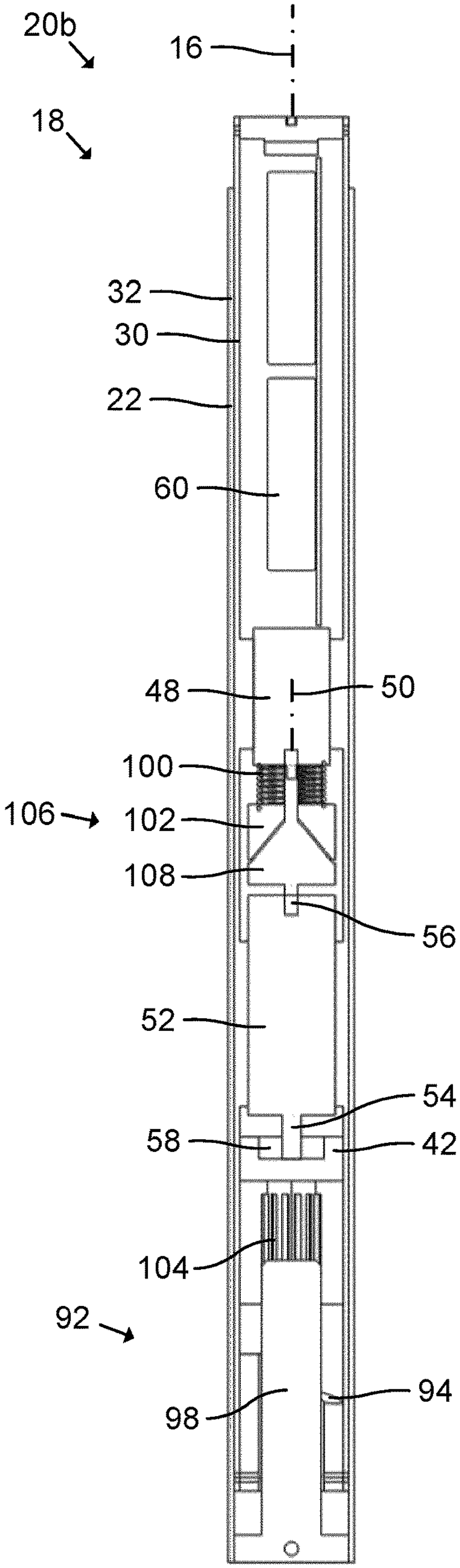
FIG. 10*b*: schematically represents a cross-sectional side view of the arrangement in FIGS. 7 to 9.

FIG. 10*a* schematically represents a cross-sectional perspective side view of the arrangement 20*b*, and FIG. 10*b* schematically represents a cross-sectional side view of the arrangement 20*b*. With collective reference to FIGS. 10*a* and 10*b*, it can be seen that the arrangement 20*b* further comprises a female spline 104. The male spline 98 mates with the female spline 104. The female spline 104 is here fixed to the driven member 42 and rotates in common with the male spline 98 about the hinge axis 16.

FIGS. 10*a* and 10*b* further show the friction brake 106 of the arrangement 20*b*. In addition to the brake spring 100 and the female part 102, the friction brake 106 of this example further comprises a male part 108. The male part 108 and the female part 102 are examples of a first brake part and a second brake part, respectively. The friction brake 106 of this example is a cone brake. The friction brake 106 is arranged inside the tubular body 22. In this example, the friction brake 106 is concentric with the hinge axis 16.

The male part 108 is here fixed to the output member 56 and to the rotor 62 of the generator 48. The female part 102 is rotationally locked, and axially movable, with respect to the hinge axis 16. The brake spring 100 is here a compression coil spring arranged between the generator 48 and the female part 102. The brake spring 100 forces the female part 102 against the male part 108 for frictional braking of relative rotation therebetween.

When a user opens the access member 14, the lifting cam follower 96 moves up along the lifting cam profile 94. Consequently, the access member 14 is lifted vertically at the same time as the access member 14 makes the opening movement 26 about the hinge axis 16. The mechanical energy from the opening movement 26 is stored as potential energy by means of the lifting transmission 92. During the opening movement 26, the male spline 98 rotates about the hinge axis 16 and moves vertically upwards along the hinge axis 16 and further into the female spline 104. The female spline 104 and the driven member 42 rotate in common with the male spline 98 about the hinge axis 16. The freewheel 58 is however disengaged during the opening movement 26.

When the user releases the access member 14, the potential energy stored in the form of the position of the lifting cam follower 96 on the lifting cam profile 94 is released. The gravity force acting on the access member part 32 and on the access member 14 pulls the lifting cam follower 96 down along the lifting cam profile 94. The access member 14 thereby performs the closing movement 28. During the closing movement 28, the freewheel 58 is engaged such that the generator 48 is driven to harvest electric energy. The friction brake 106 also assists to brake the closing movement 28. At the end of the closing movement 28, the lifting cam follower 96 reaches the steep section of the lifting cam profile 94. The lifting transmission 92 thereby generates a higher closing torque for latching the access member 14.

Although the arrangement 20*b* is described as comprising the generator 48 and the control system 60, these components may be omitted to provide an entirely mechanical device. The generator 48 and the control system 60 may thus be add-on features. The generator transmission 52 may however still be used to provide frictional braking on the high-speed output member 56.

Figure 11:
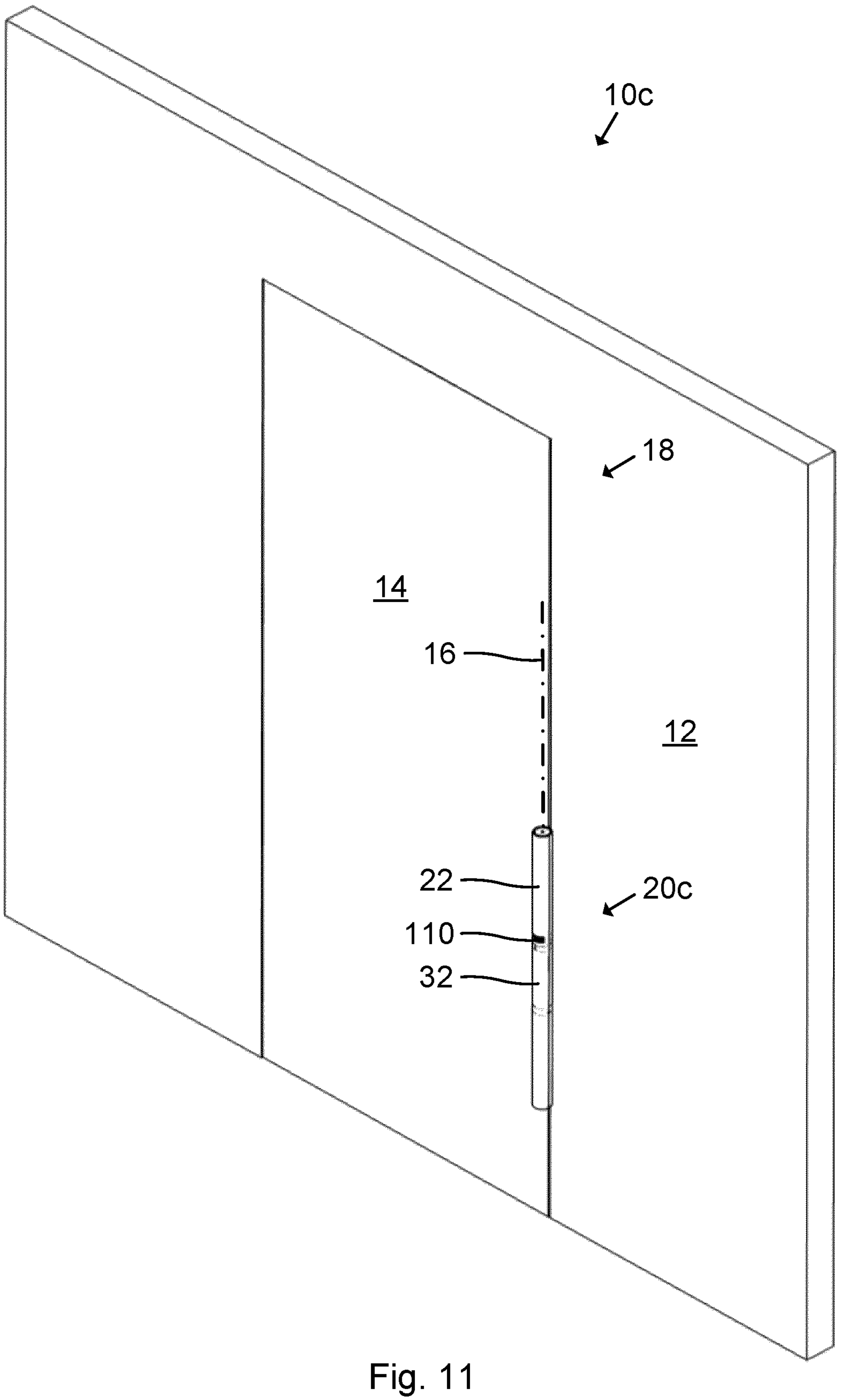
FIG. 11: schematically represents a perspective view of a further access member system comprising an access member in a closed position and a further example of an arrangement.

FIG. 11 schematically represents a perspective view of a further access member system 10*c*. The access member system 10*c* comprises a further example of an arrangement 20*c* for closing the access member 14. In FIG. 11, the access member 14 is in the closed position 18.

The arrangement 20*c* comprises an adjustment screw 110. The adjustment screw 110 is one example of an adjustment mechanism according to the present disclosure. As shown in FIG. 11, the adjustment screw 110 is manually accessible from the exterior of the arrangement 20*c*.

Figure 12A:
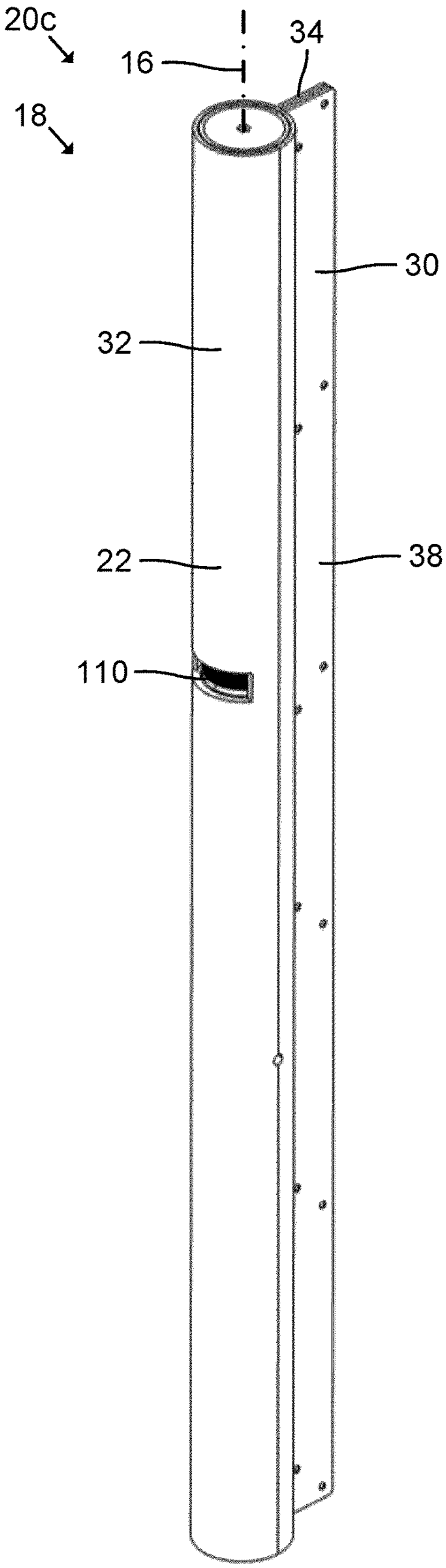
FIG. 12*a*: schematically represents a perspective side view of the arrangement in FIG. 11.

FIG. 12*a* schematically represents a perspective side view of the arrangement 20*c*. In FIG. 12*a*, the adjustment screw 110 can be seen more clearly. The frame part 30 and the access member part 32 of the arrangement 20*c* may be of the same, or substantially the same, design as in the arrangement 20*a*.

Figure 12B:
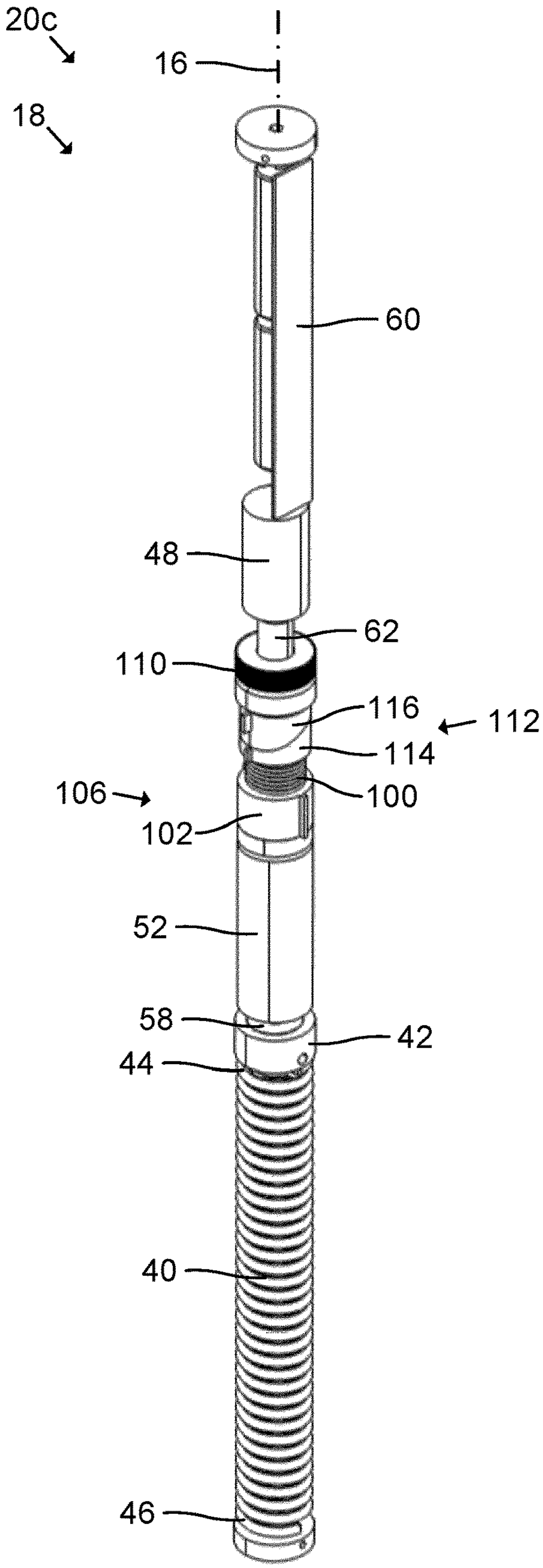
FIG. 12*b*: schematically represents a partial perspective side view of the arrangement in FIG. 11.

FIG. 12*b* schematically represents a partial perspective side view of the arrangement 20*c*. In FIG. 12*b*, the frame part 30 and the access member part 32 are removed. The arrangement 20*c* comprises the closing spring 40 of the same type as in the arrangement 20*a*, and the friction brake 106 of the same type as in the arrangement 20*b*.

The arrangement 20*c* further comprises a brake transmission 112. The brake transmission 112 is configured to vary the braking torque of the friction brake 106 in dependence of a rotational position of the access member 14 about the hinge axis 16 during the closing movement 28. The braking torque may be zero or close to zero in rotational positions close to the closed position 18 to improve latching of the access member 14.

The brake transmission 112 comprises a brake cam profile 114 and a brake cam follower 116 arranged to follow the brake cam profile 114. As shown in FIG. 12*b*, the brake cam profile 114 and the brake cam follower 116 are here exemplified as complementary wave-shaped members that mate in the closed position 18. In this example, the brake cam profile 114 and the brake cam follower 116 are concentric with the hinge axis 16 and arranged inside the tubular body 22.

The brake cam profile 114 is rotationally locked, and axially movable, with respect to the hinge axis 16. The brake cam follower 116 is axially locked, and rotationally movable, with respect to the hinge axis 16. Rotation of the adjustment screw 110 (about the hinge axis 16) in a first direction and a second direction moves the cam follower downwards and upwards (along the hinge axis 16), respectively.

Figure 13A:
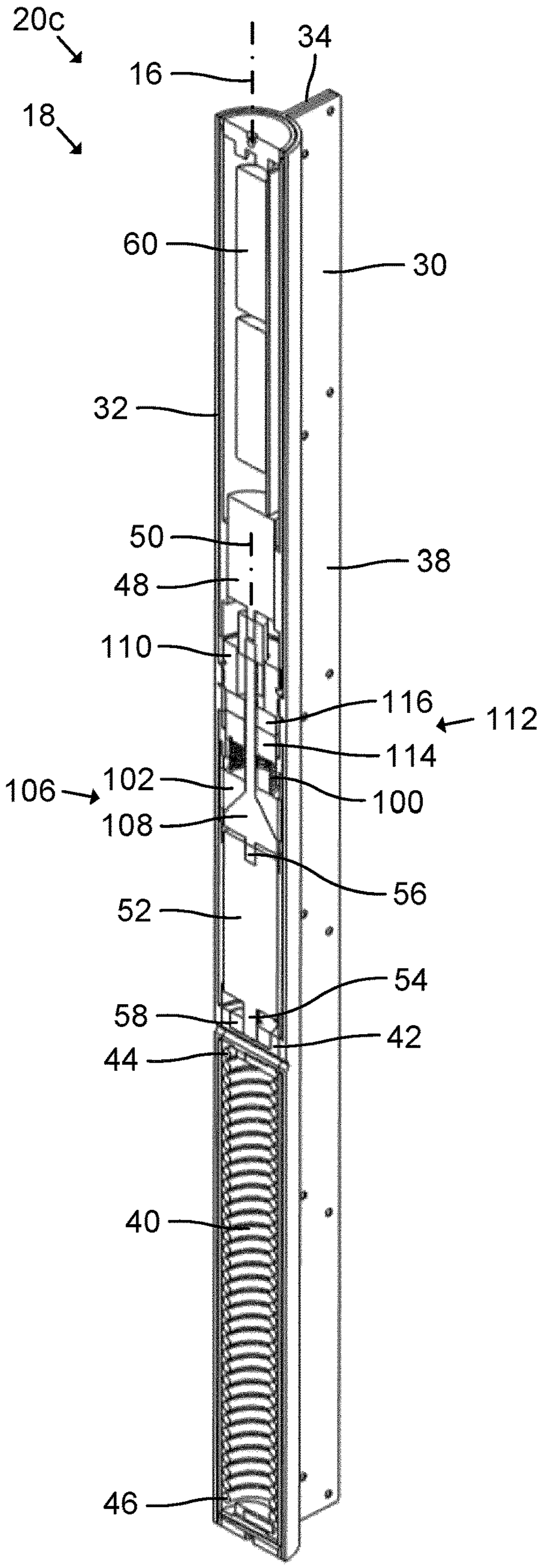
FIG. 13*a*: schematically represents a cross-sectional perspective side view of the arrangement in FIGS. 11 and 12.
Figure 13B:
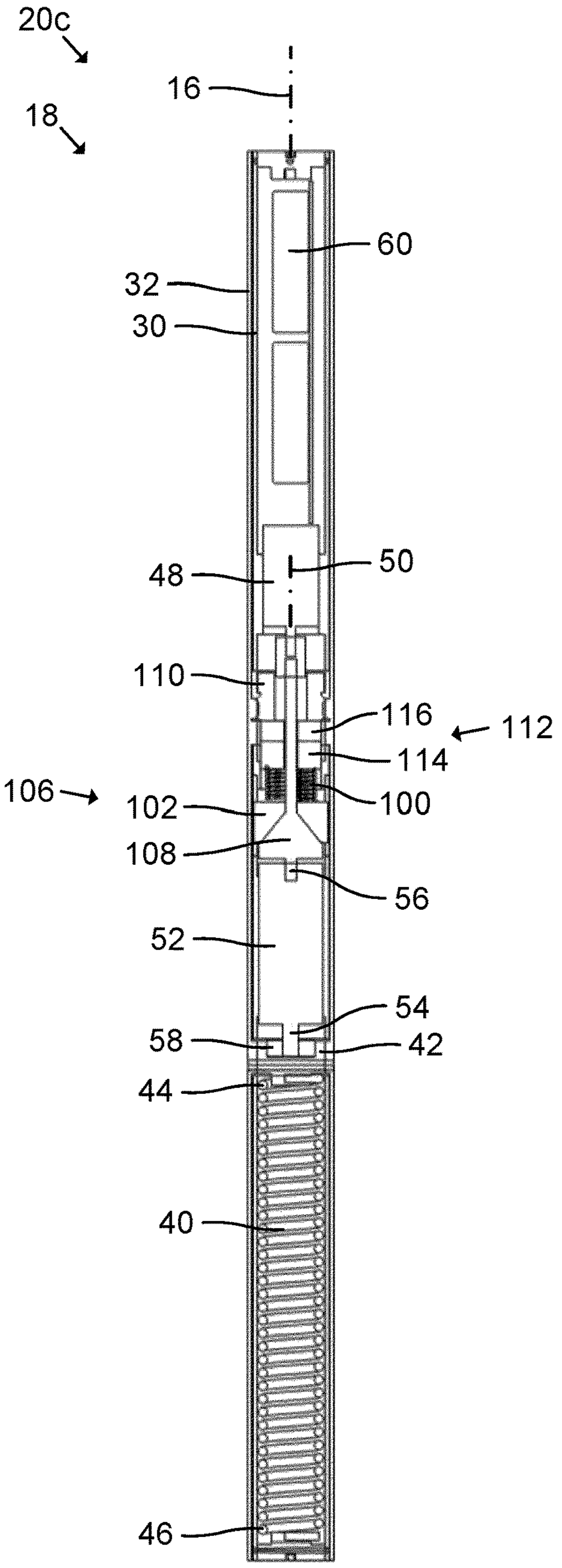
FIG. 13*b*: schematically represents a cross-sectional side view of the arrangement in FIGS. 11 and 12.

FIG. 13*a* schematically represents a cross-sectional perspective side view of the arrangement 20*c*, and FIG. 13*b* schematically represents a cross-sectional side view of the arrangement 20*c*. With collective reference to FIGS. 13*a* and 13*b*, the brake cam follower 116 is fixed to the access member part 32. The brake spring 100 is arranged between the brake cam profile 114 and the female part 102. By means of the adjustment screw 110, the pretension in the brake spring 100 can easily be adjusted, e.g. to adjust a closing speed and a latching force of the access member 14.

During the opening movement 26, the brake cam follower 116 rotates together with the access member part 32 about the hinge axis 16 and thereby pushes the brake cam profile 114 increasingly downwards against the compression of the brake spring 100. An increasing contact force thereby occurs between the female part 102 and the male part 108. Potential energy is stored in the closing spring 40 during the opening movement 26 but the freewheel 58 is disengaged. As a consequence, no energy harvesting and no frictional braking occurs during the opening movement 26.

When the user releases the access member 14 in the open position 24, the closing spring 40 forces the access member 14 to perform the closing movement 28. During the closing movement 28, the freewheel 58 is engaged. The compression in the brake spring 100 is initially relatively high. A relatively high braking torque is thereby provided initially by the friction brake 106. The braking torque decreases more and more during the closing movement 28 due to the shape of the brake cam profile 114. At the end of the closing movement 28, the braking torque is released to provide a stronger latching of the access member 14 into the closed position 18. During the closing movement 28, the generator 48 is driven to harvest electric energy. This will also provide a braking torque to the access member part 32. The electric load of the generator 48 may also be controlled to control the braking torque from the generator 48. However, the arrangement 20*c* may be purely mechanical. That is, the generator 48 and the control system 60 may be omitted. Furthermore, the arrangement 20*c* may comprise the lifting transmission 92 instead of the closing spring 40 as the force device.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An arrangement for closing an access member rotatable relative to a frame, the arrangement comprising:
- a frame part for fixation to the frame;
- an access member part for fixation to the access member, the access member part being rotatable relative to the frame part about a hinge axis between a closed position and an open position;
- a mechanical force device configured to store mechanical energy from an opening movement of the access member part from the closed position to the open position, and configured to release the stored mechanical energy to a closing movement of the access member part from the open position to the closed position;
- an electromagnetic generator arranged concentric with the hinge axis and arranged to be driven by the closing movement to generate electric energy; and
- a freewheel arranged to disengage during the opening movement and to engage during the closing movement to drive the generator.

2. The arrangement according to claim 1, further comprising a control system configured to control an electric load of the generator.

3. The arrangement according to claim 2, wherein the control system is electrically powered by the generator.

4. The arrangement according to claim 1, wherein the hinge axis is vertically oriented, and wherein the force device comprises a lifting transmission arranged to lift the access member part vertically during the opening movement and arranged to lower the access member part vertically by gravity during the closing movement.

5. The arrangement according to claim 4, wherein the lifting transmission comprises a lifting cam profile and a lifting cam follower arranged to follow the lifting cam profile.

6. The arrangement according to claim 1, further comprising a friction brake arranged to brake the closing movement.

7. The arrangement according to claim 6, further comprising a brake transmission arranged to transmit movements of the access member part between the closed position and the open position to an increase and a decrease of a braking torque of the friction brake.

8. The arrangement according to claim 7, wherein the brake transmission is configured to substantially eliminate the braking torque of the friction brake during a last part of the closing movement.

9. The arrangement according to claim 7, wherein the brake transmission comprises a brake cam profile and a brake cam follower arranged to follow the brake cam profile.

10. An arrangement for closing an access member rotatable relative to a frame, the arrangement comprising:

a frame part for fixation to the frame;

an access member part for fixation to the access member, the access member part being rotatable relative to the frame part about a vertical hinge axis between a closed position and an open position; and a mechanical force device configured to store mechanical energy from an opening movement of the access member part from the closed position to the open position, and configured to release the stored mechanical energy to a closing movement of the access member part from the open position to the closed position;

wherein the force device comprises a lifting transmission arranged to lift the access member part vertically during the opening movement and arranged to lower the access member part vertically by gravity during the closing movement;

wherein the lifting transmission comprises a lifting cam profile and a lifting cam follower arranged to follow the lifting cam profile; and wherein the lifting cam profile is steeper in a section contacted by the lifting cam follower during a last part of the closing movement than in a remaining section of the lifting cam profile for being contacted by the lifting cam follower.

11. An arrangement for closing an access member rotatable relative to a frame, the arrangement comprising:

a frame part for fixation to the frame;

an access member part for fixation to the access member, the access member part being rotatable relative to the frame part about a hinge axis between a closed position and an open position;

a mechanical force device configured to store mechanical energy from an opening movement of the access member part from the closed position to the open position, and configured to release the stored mechanical energy to a closing movement of the access member part from the open position to the closed position;

a friction brake arranged to brake the closing movement;

a brake transmission arranged to transmit movements of the access member part between the closed position and the open position to an increase and a decrease of a braking torque of the friction brake; and an electromagnetic generator arranged to be driven by the closing movement to generate electric energy.

12. The arrangement according to claim 11, wherein the arrangement comprises a hollow elongated body.

13. The arrangement according to claim 12, wherein the force device is arranged inside the hollow elongated body.

14. The arrangement according to claim 12, wherein the generator is arranged inside the hollow elongated body.

15. The arrangement according to claim 12, wherein the hollow elongated body is concentric with the hinge axis.

16. The arrangement according to claim 11, wherein the force device comprises a closing spring arranged to force the access member part towards the closed position.

17. An access member system comprising the frame, the access member and an arrangement according to claim 11, wherein the frame part is fixed to the frame and the access member part is fixed to the access member.

18. The access member system according to claim 17, wherein the access member is rotatable relative to the frame about the hinge axis.

* * * * *